US008396256B2

(12) United States Patent  (10) Patent No.: US 8,396,256 B2
Lu et al.  (45) Date of Patent: Mar. 12, 2013

(54) PARALLEL COMPUTING OF LINE OF SIGHT VIEW-SHED

(75) Inventors: Ligang Lu, New City, NY (US); Brent Paulovicks, Danbury, CT (US); Michael Peter Perrone, Yorktown Heights, NY (US); Vadim Sheinin, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 12/731,579

(22) Filed: Mar. 25, 2010

(65) Prior Publication Data

US 2011/0235869 A1    Sep. 29, 2011

(51) Int. Cl.
  *G06K 9/00*   (2006.01)
  *G06F 15/80*  (2006.01)
  *G01C 1/00*   (2006.01)
(52) U.S. Cl. .................. 382/113; 345/505; 356/145
(58) Field of Classification Search .................. 382/100, 382/113; 345/421, 441, 629, 933, 443, 505, 345/633; 356/145, 146, 219, 253
  See application file for complete search history.

(56) References Cited

U.S. PATENT DOCUMENTS

| 6,166,744 | A  | * | 12/2000 | Jaszlics et al. | 345/629 |
| 7,148,861 | B2 | * | 12/2006 | Yelton et al.   | 345/8   |
| 8,103,113 | B2 | * | 1/2012  | Yamazaki        | 382/232 |
| 2009/0244070 | A1 |  | 10/2009 | Mattikalli et al. | |

FOREIGN PATENT DOCUMENTS

WO    2007118842 A1    10/2007

OTHER PUBLICATIONS

Z-Y. Xu et al., "A Novel Algorithm for Viewshed Based on Digital Elevation Model," IEEE, Asia-Pacific Conference on Informatino Processing, Jul. 2009, pp. 294-297, vol. 2, Shenzhen, Guangdong, China.
B. Kaučič et al., "Comparison of Viewshed Algorithms on Regular Spaced Points," Proceedings of the 18th Spring Conference on Computer Graphics, 2002, pp. 177-183, Budmerice, Slovakia.
C. Bostian et al., "Broadband Wireless Communications for Disaster Relief: A Project of Virginia Tech's Center for Wireless Telecommunications (CWT) Science Applications International Corporation," Proceedings of the 2002 Annual National Converence on Digital Government Research, 2002, pp. 1-70, vol. 129.

* cited by examiner

*Primary Examiner* — Abolfazl Tabatabai
(74) *Attorney, Agent, or Firm* — Anne V. Dougherty; Ryan, Mason & Lewis, LLP (57) ABSTRACT

Techniques are disclosed for parallel computing of a line of sight (LoS) map (e.g., view-shed) in a parallel computing system. For example, a method for computing an LoS map comprises the following steps. Data representing at least one image is obtained. An observation point in the at least one image is identified. A portion of the data that is associated with a given area in the image is partitioned into a plurality of sub-areas. The plurality of sub-areas are assigned to a plurality of processor elements of a parallel computing system, respectively, such that the data associated with each one of the plurality of sub-areas is processed independent from the data associated with each other of the plurality of sub-areas, wherein results of the processing by the processor elements represents the LoS map. The parallel computing system may be a multicore processor.

20 Claims, 10 Drawing Sheets

PARALLEL COMPUTING OF LINE OF SIGHT VIEW-SHED

FIELD OF THE INVENTION

The present invention relates to parallel computing and, more particularly, to the parallel computing of Line of Sight (LoS) view-shed in a parallel computing system such as a multicore processor.

BACKGROUND OF THE INVENTION

The LoS view-shed computation is used in many civil and military applications, such as, for example, cellular tower distribution, city planning, surveillance system deployment, military maneuver, border monitoring, etc. In these applications, the visibility from an observation point to other points within an area of interest (AOI) needs to be determined. The map of all visible points in the AOI from the observation point constitutes the LoS view-shed.

Therefore, in general, the problem of LoS view-shed computation is to determine the visibility of all points in an AOI from a given observation point.

SUMMARY OF THE INVENTION

Principles of the invention provide techniques for parallel computing of an LoS map (e.g., view-shed) in a parallel computing system.

For example, in one aspect, a method for computing an LoS map comprises the following steps. Data representing at least one image is obtained. An observation point in the at least one image is identified. A portion of the data that is associated with a given area in the image is partitioned into a plurality of sub-areas. The plurality of sub-areas are assigned to a plurality of processor elements of a parallel computing system, respectively, such that the data associated with each one of the plurality of sub-areas is processed independent from the data associated with each other of the plurality of sub-areas, wherein results of the processing by the processor elements represents the LoS map. The partitioning step may further comprise partitioning the portion of the data that is associated with the given area in the image into the plurality of sub-areas such that any ray growing out of the observation point intersects only one of the plurality of sub-areas.

Further, one or more single-instruction-multiple-data (SIMD) operations can be performed on each one of the plurality of sub-areas and in each one of the processor elements. That is, one of the one or more single-instruction-multiple-data operations may be applied to the same corresponding data points on a plurality of rays that are respectively identified in every one of the sub-areas.

Still further, the data in at least a portion of the plurality of sub-areas may be transposed such that the data is aligned to efficiently perform single-instruction-multiple-data operations. To reduce input and output latency, a double buffering method may be used wherein the data of the sub-area is partitioned into two or more bands of data such that while the processor element of the sub-area is processing data associated with a first one of the bands in one input buffer, data associated with a second one of the bands is fetched into a second input buffer. Likewise, the view-shed results of one data band are stored in one output buffer while the view-shed results of a previous band stored in the second output buffer are being sent out. Also, data in a sub-area may be transposed with a recursive byte shuffle algorithm comprising multiple swaps with data elements among a set of registers or vector variables.

In an illustrative embodiment, the parallel computing system comprises a multicore processor.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Illustrative embodiments of the invention will be described below in the context of a multicore processor environment. However, it is to be appreciated that principles of the invention are not limited to such an environment, but rather are more generally applicable to any parallel processing environment wherein it would be desirable to compute an LoS view-shed.

As will be explained in detail below, illustrative embodiments of the invention provide a combined LoS computing algorithm as well as data partition and computation load allocation methods for efficient parallel computing of an LoS view-shed. Illustrative embodiments of the invention also provide a fast data transform algorithm to prepare the input data for efficient Single-Instruction-Multiple-Data (SIMD) operations. Furthermore, illustrative embodiments of the invention provide data flow control and management methods to minimize the wait time for data fetching and storing in Direct-Memory-Access (DMA) operations.

Figure 1:
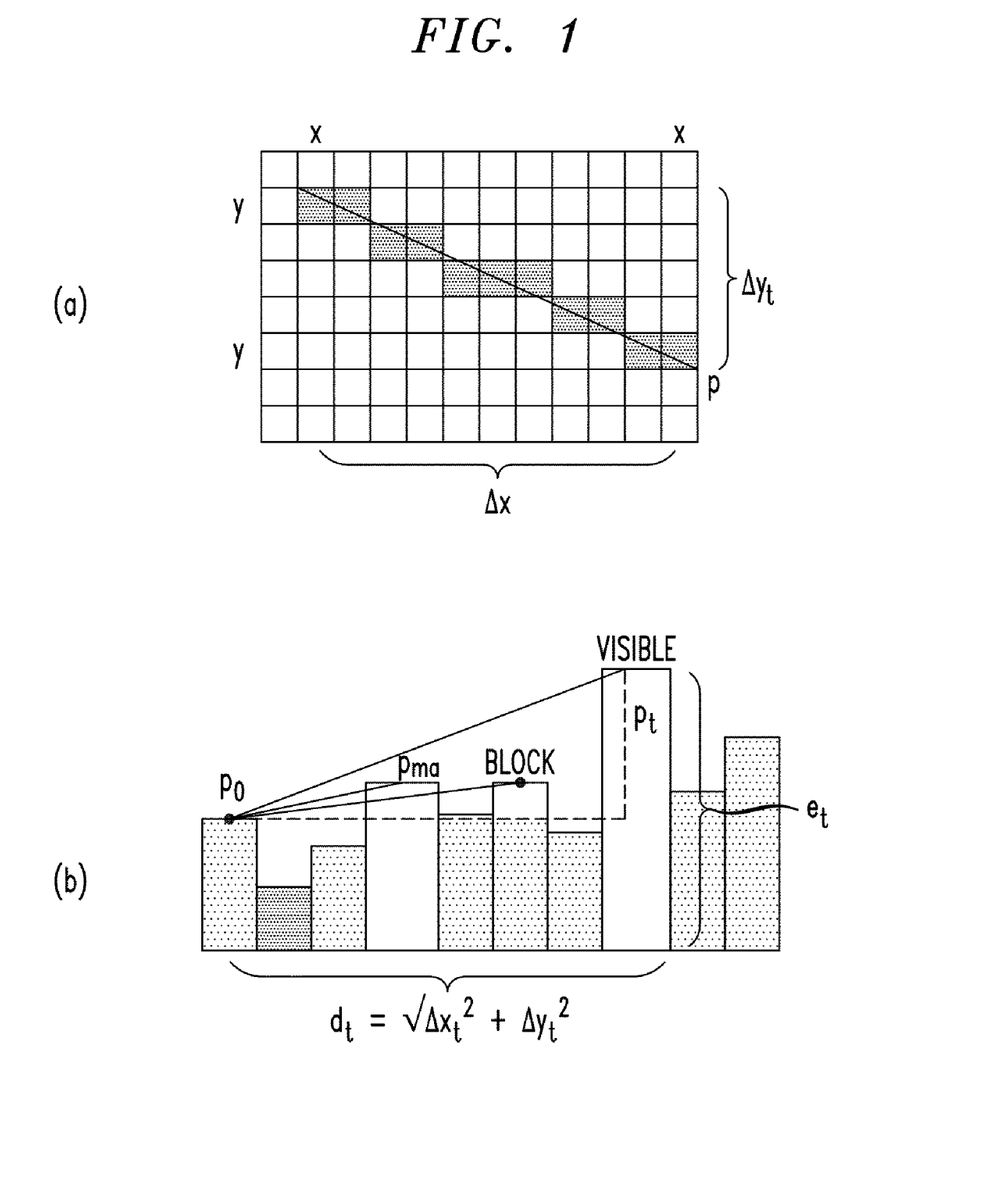
FIGS. 1(a) and 1(b) respectively show the two basic steps for computing an LoS view-shed, according to an embodiment of the invention.

In an LoS computation, determining the visibility between the points $P_0$ (observation point) and $P_t$ (target point) takes two steps. The first step is to compute the coordinates of all points on the line that connects the two points $P_0$ and $P_t$. In the discrete coordinate system (x,y), a line is represented by a zig-zag approximation as shown in FIG. 1(a). In one embodiment, the well known Bresenham line drawing algorithm may be used to determine the coordinates of the points on the line, see, e.g., J. E. Bresenham, "Algorithm for computer control of a digital plotter," IBM Systems Journal, vol. 4, no. 1, January 1965, pp. 25-30, the disclosure of which is incorporated by reference herein.

The second step is to calculate the slope in elevation e between $P_0$ and $P_t$ and compare it with the maximum slope among all the points between $P_0$ and $P_t$ on the line to determine the visibility of $P_t$ from $P_0$, as shown in FIG. 1(b). The slope is determined by the ratio of the difference in the elevation over the distance between $P_t$ and $P_0$. If the slope is larger than the maximum slope, then $P_t$ is visible from $P_0$; otherwise $P_t$ is not visible (blocked).

A main goal of the LoS computation is to compute all the visible points in an area of interest (AOI) from a center observation point in real-time or faster. The AOI can be defined by a set of parameters. For instance, if the AOI is a square centered at the observation point, it can be defined by one parameter R as (2R+1)×(2R+1), where R is the half length of the square side. The input data is the elevation map, for example, a Digital Elevation Model (DEM) image file, in which each value is the elevation at a point whose coordinates can be derived from the data storing format of the file. The DEM image file may be in a GeoTIFF format (Geo Tagged Image File Format is a public domain metadata standard which allows geo-referencing information to be embedded within a TIFF file); however, principles of the invention are not limited to this format.

Figure 2:
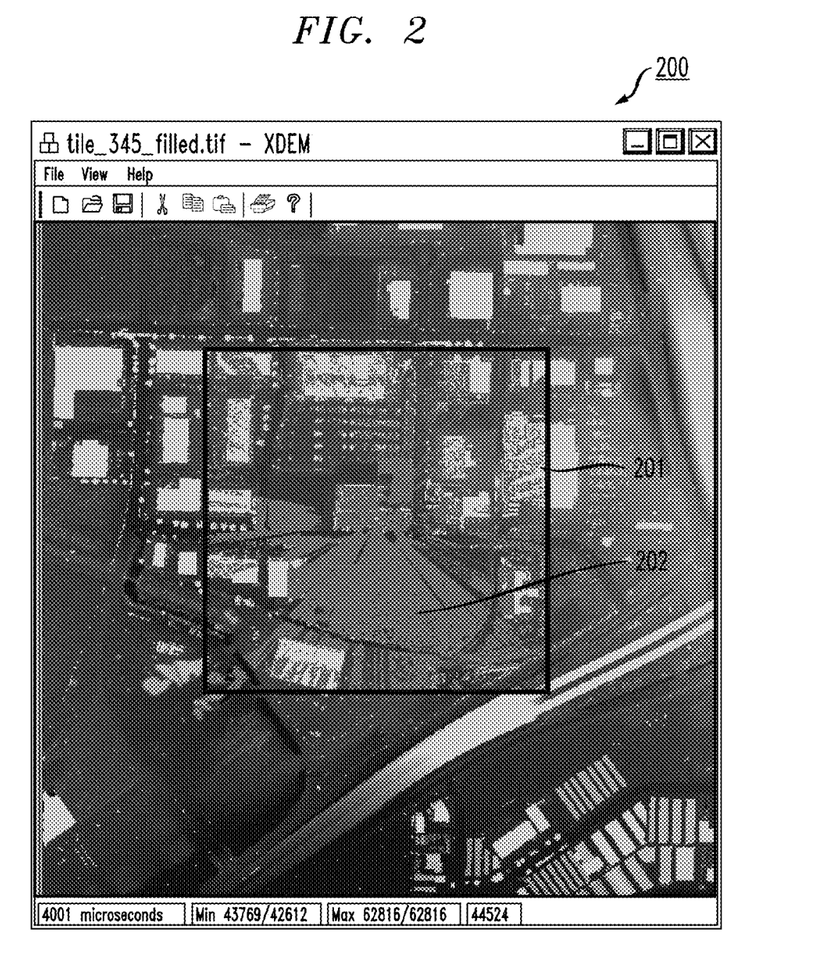
FIG. 2 shows a graphical user interface for presenting an LoS AOI and computed view-shed, according to an embodiment of the invention.

An example of an LoS AOI and computed view-shed is displayed in the graphical user interface (GUI) 200 shown in FIG. 2. In particular, GUI 200 displays a DEM image. The AOI is a square in the frame 201 with a size of (2R+1)×(2R+1) and R is specified by the user. The calculated view-shed of this AOI is also displayed on the GUI with the visible points marked in the dark shading 202.

Advantageously, illustrative principles of the invention provide for combining and simplifying the above two steps in order to optimize the view-shed computation. Below, we show illustrative pseudo code for the combined and simplified calculation of the visibility of all points for the line joining $P_t$ and $P_0$:

```
function LoS(x0,y0,     // (x0, y0) coordinates of P_0, (x_t,y_t) coordinates of
x_t, y_t)              // the target point P_t
{  Δx =xt - x0 ;        // Δx and Δy are the distance between the
   Δy = yt - y0;        two points
   err = (Δx+1)/2;      // err is a variable to control the increment in y
   Smax = -Max;         // Smax is the maximum slope on the line
   x = x0; y = y0;
   for x = x0 to x = xt
     S = (e-e_0)/d      // S the current slope, e and e_0 the elevations
                        at p(x,y)
                        // and p(x0, y0); d is the distance between
                        p(x0, y0)
                        // and p(x_t,y_t);
     if S < Smax then p(x,y) not visible;
     else { Smax=S; p(x,y) visible;}
     err = err - Δy;
     if err < 0 then y=y+1;
     err = err + Δx;
}
```

Figure 3:
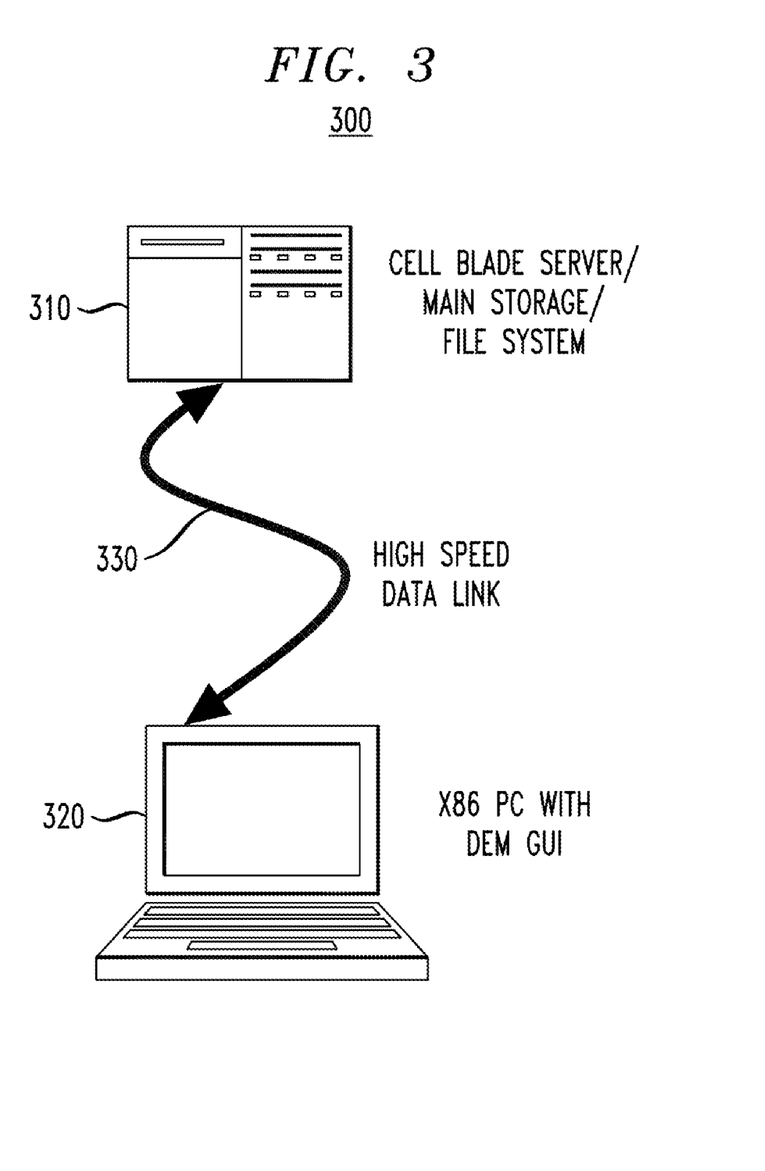
FIG. 3 shows a system for computing and presenting an LoS view-shed, according to an embodiment of the invention.

In one illustrative embodiment, a system for the LoS view-shed computation comprises a server-client arrangement 300 as shown in FIG. 3. In this embodiment, the server 310 is executing on a Cell Blade QS21 with 8 Synergistic Processing Elements (SPEs) and one PowerPC Processing Element (PPE). The Cell Blade QS21 is available from IBM Corporation (Armonk, N.Y.). The server 310 also has main memory and file system installed. The server 310 is referred to as a Cell Broadband Engine (CBE) and is one example of a multicore processor with which the invention may be implemented. On the client side is an Intel Corporation (Santa Clara, Calif.) x86 computer 320 (desktop or laptop personal computer) capable of generating and displaying the above-described GUI (200) for DEM data viewing and display of the computed view-shed. The server 310 and the client device 320 are connected through a Gigabit Ethernet Link 330. It is to be appreciated that implementation of the invention is not intended to be limited to the system 300.

It is realized that the determination of how to partition the data and the computing task of the LoS problem to efficiently utilize the resource and hardware/software capabilities of the CBE has a direct impact on the performance of the implementation. Accordingly, below we describe illustrative embodiments employing strategies and methods for data partition, work load distribution, DMA management, and pipeline control in the exemplary multicore processor environment represented in FIG. 3.

Data Partition Strategy for Parallel Computing

From the LoS algorithm description above, it can be seen that the visibility of a point on a line depends on the maximum elevation slope of all previous points. To maximize the LoS parallel computing efficiency, principles of the invention provide for partitioning the data into sub-areas such that each sub-area can be processed independent of the other sub-area. Furthermore, to fully utilize the parallel computing capability of the CBE with 8 SPEs and 1 PPE, principles of the invention also provide for partitioning the computation load evenly among the SPEs.

Figure 4:
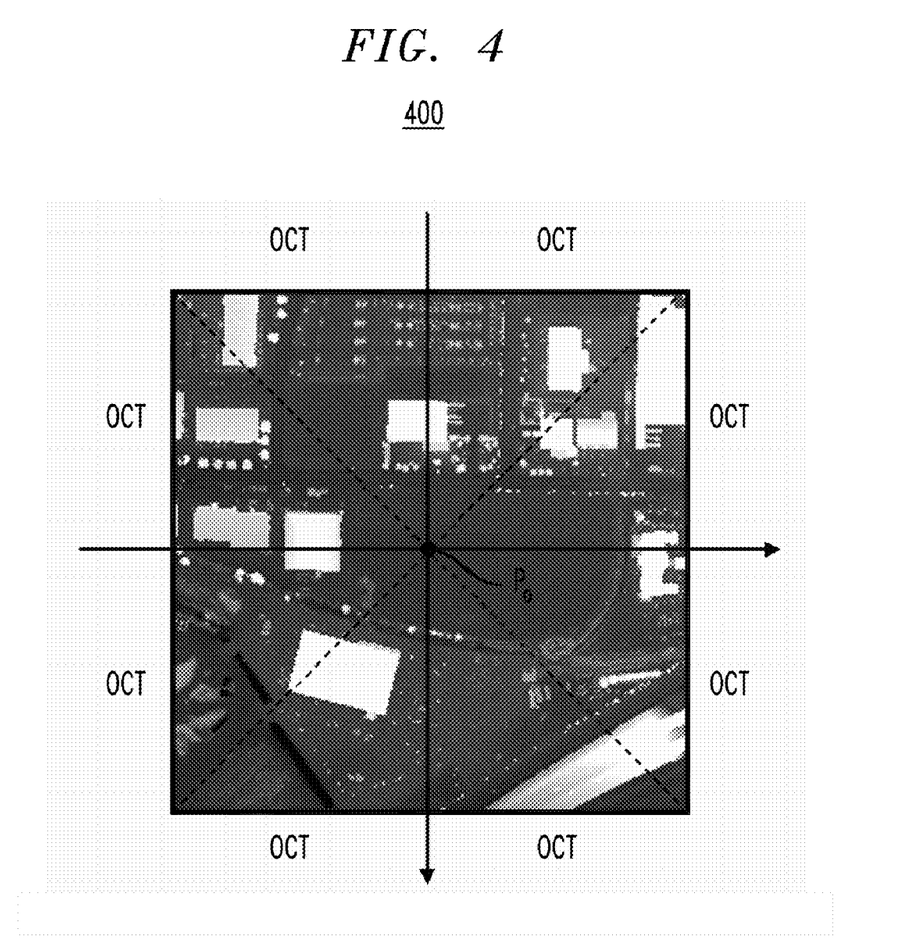
FIG. 4 shows a data partition method, according to an embodiment of the invention.

For the given AOI in FIG. 2, we partition it into sub-areas in such a way that a ray coming out from the observation point will intersect with only one sub-area as the ray grows (projects outward) from the observation point. FIG. 4 shows an example of an illustrative data partition method 400. As shown, the AOI of (2R+1)×(2R+1) square is partitioned into 8 octants, wherein each octant is considered a sub-area. In this way, the lines of sight grow out of the center observation point $P_0$ and will not intersect with more than one octant so that efficient utilization of the system computing resource, data fetching and store management methods, as well as the independent computing of the data in each SPE's local store, can be carried out.

Computation Load Distribution

Figure 5:
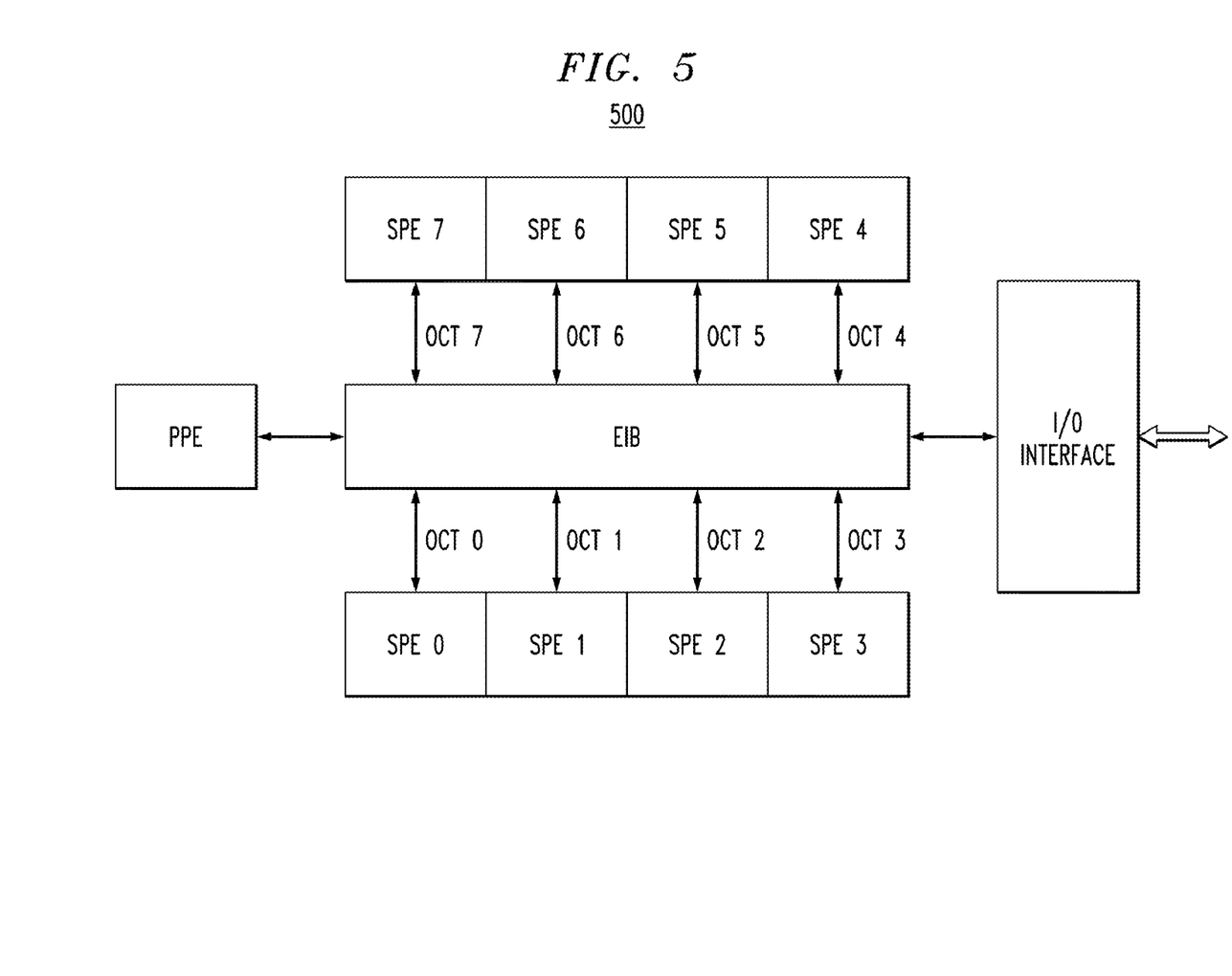
FIG. 5 shows a computation load partition method, according to an embodiment of the invention.

As mentioned above, in this illustrative embodiment, 8 SPEs and 1 PPE of the CBE are used to do the LoS view-shed parallel computing work. To make efficient use of the characteristics of an SPE and a PPE, we assign each SPE to compute the LoS view-shed for one octant of the AOI while the PPE is used for the administrative work, such as preparing the parameters and passing them to SPEs, initiating the tasks on SPEs, and assembling the results from SPEs. FIG. 5 illustrates the computation load partition 500 in one embodiment of the inventive LoS view-shed parallel computing methodology. As shown, the SPEs, the PPE, and an input/output (I/O) interface of the CBE communicate via a communication bus (Element Interconnect Bus or EIB).

It is to be appreciated that since principles of the invention may be applied to other suitable parallel computing environments (i.e., with multiple parallel processing cores, elements or devices), details about the specific processing elements shown and described here (i.e., SPEs and PPEs), as well as the internal communication bus (EIB) and I/O interface are omitted for clarity and simplicity. Details of these specific components may be found in the Cell Blade QS21 technical literature (available from IBM Corporation of Armonk, N.Y.), the disclosure of which is incorporated by reference herein.

Parallel Computing in SPE

Another key part of the LoS parallel computing methodology of the invention is related to how to efficiently utilize the single-instruction-multiple-data (SIMD) capability, also known as vector processing, associated with the SPEs. As is known, SIMD refers to computers with multiple processing elements that perform the same operation on multiple data simultaneously.

Because the visibility of a point on a ray has dependency on the maximum slope of all previous points on that ray, parallel computation using SIMD operations can not be done on multiple points along the same ray. However, we can apply SIMD operations on multiple points across the rays. For example as shown in the graph 600 of FIG. 6, in Octant 0, we grow R+1 rays from the center point where x=0 to the edge of the AOI where x=R+1. For each step in x, we use SIMD operations to compute the visibilities of the points of 4 rays at the same x (as the box labeled A shown in FIG. 6) one step at a time, until the visibilities of all rays at that x (only y varies) are computed. In Octant 1, the same parallel computing method can be applied with x and y coordinates exchanged.

Figure 6:
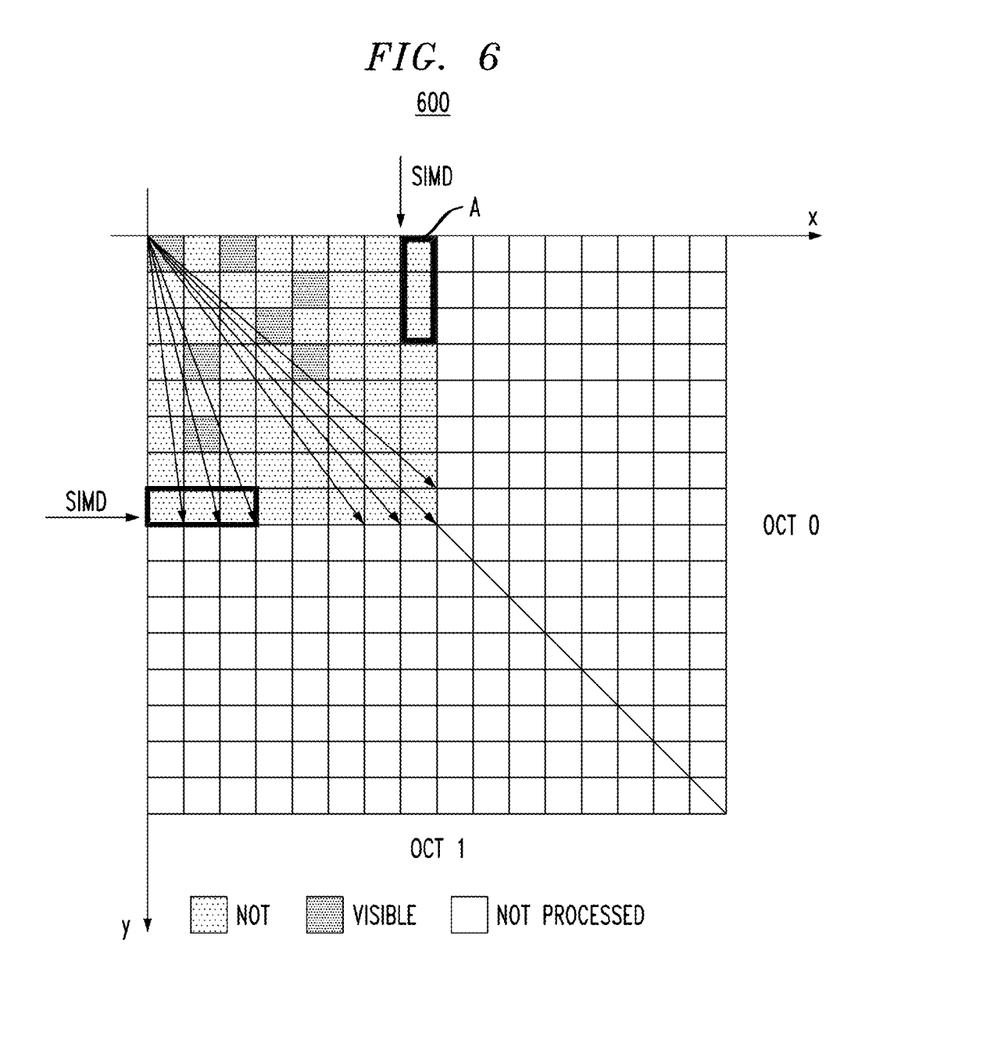
FIG. 6 shows application of single-instruction-multiple-data operations on multiple points across rays, according to an embodiment of the invention.

From FIG. 6, it can be seen that in order to apply SIMD in Octant 0, the DEM data of a 4-point column needs to be loaded into the instruction register. Because the view-shed computing involves division and square root calculations, it is carried out in the floating point precision. Therefore, the DEM data in 16-bit short integer format is converted to 32-bit floating point numbers. The Cell Blade instruction register has 128 bits, so it can hold 4 32-bit data points. For efficient SIMD operations, 4 data points are loaded into the instruction register so the same instruction can be executed simultaneously on all 4 data points.

Furthermore, since the physical memory is designed for data to be read from and written to in rows and not in columns, it will require 4 memory readings to fetch the 4 corresponding data points followed by several other instructions to put the needed bytes into the register. Such a process would be very inefficient. Illustrative embodiments of the invention therefore provide for fetching the data in multiple rows and transposing the data using an efficient recursive byte shuffle algorithm.

Figure 7:
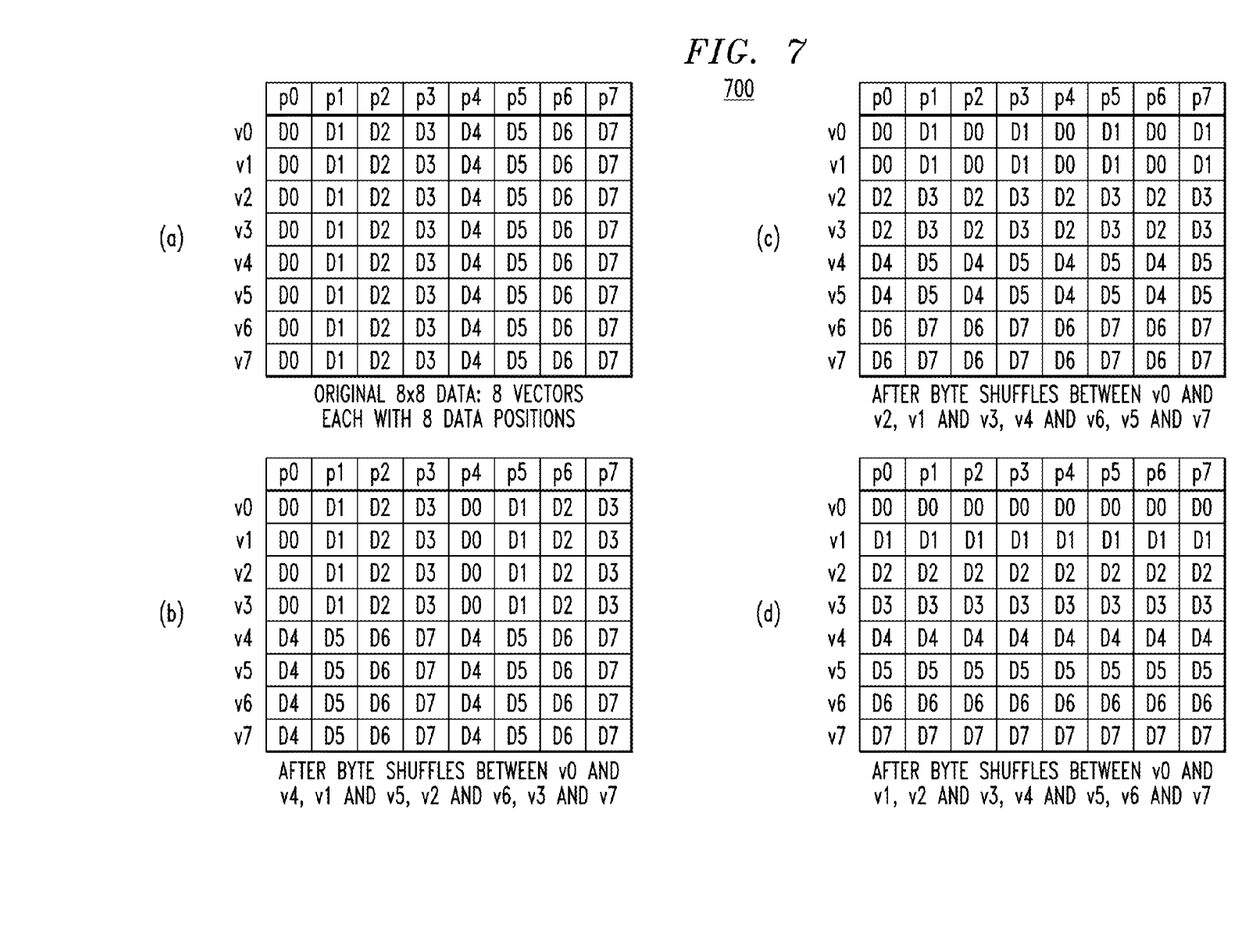
FIGS. 7(a) through 7(d) show a method for recursive byte shuffle for data transpose, according to an embodiment of the invention.

As an illustrative example shown in FIG. 7, an 8×8 original data block (FIG. 7(*a*)) is transposed with a recursive byte shuffle algorithm 700. The elements of the 8×8 data block are loaded into 8 vector variables or registers, v0, v1, . . . , v7, and each of the vectors holds 8 data elements in position p0, p1, . . . , p7, respectively. In this case, the algorithm completes the transpose in three recursive steps with SIMD byte shuffle operations.

Step 1: Perform a 4×4 data block swap in the reverse diagonal direction, i.e., the data elements in position p4~p7 in v0~v3 are swapped with the elements in p0~p3 in v4~v7. FIG. 7(*b*) shows the results after the SIMD byte shuffle operations of this step.

Step 2: Perform 2×2 data block swaps, i.e., data elements in p2~p3 and p6~p7 in v0~v1 and v4~v5 are swapped with the data elements in p0~p1 and p4~p5 in v2~v3 and v6~v7, respectively. FIG. 7(*c*) shows the results after the SIMD byte shuffle operations of this step.

Step 3: Perform 1×1 data block swaps, i.e., data elements in p1, p3, p5, and p7 in v0, v2, v4, and v6 are swapped with the data elements in p0, p2, p4, and p6 in v1, v3, v5, and v7, respectively. FIG. 7(*d*) shows the results after the SIMD byte shuffle operations of this step.

Figure 8:
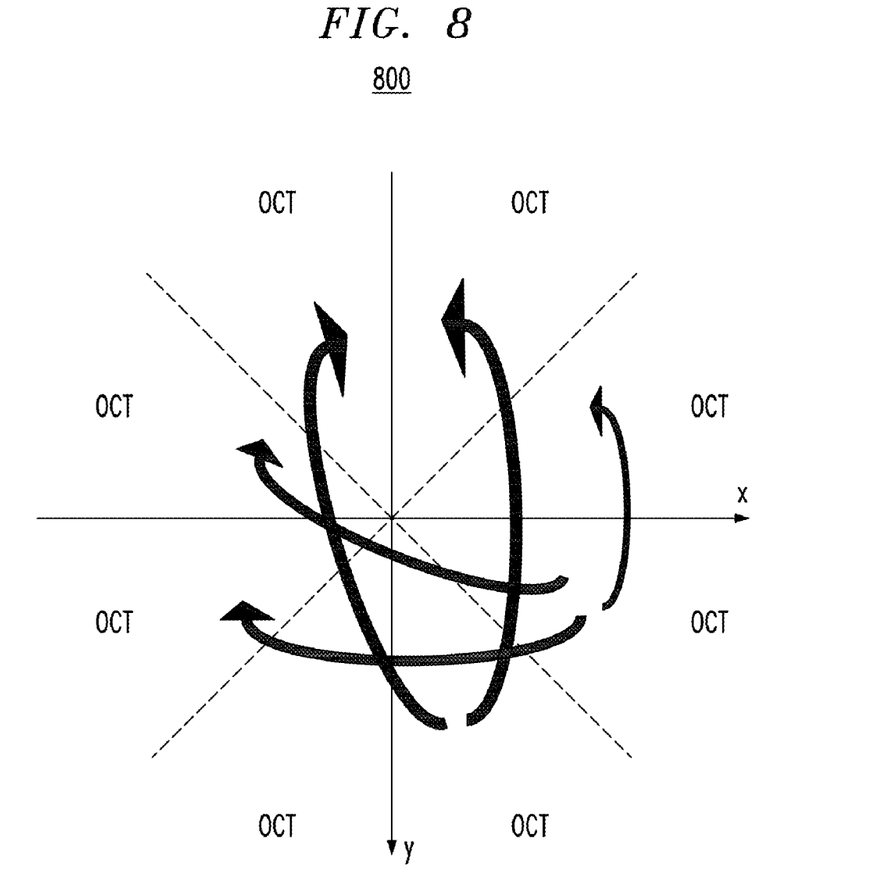
FIG. 8 shows how other quadrants are reflections of Quadrant 0 and Quadrant 1 with respect to the x-axis, or the y-axis, or the origin, respectively, and thus how the operations for Quadrant 0 and Quadrant 1 can be applied in other quadrants with proper indexing changes, according to an embodiment of the invention.

Once these efficient methods to compute Octant 0 and Octant 1 using SIMD operations are employed, the other octants can be treated as various reflections of Octant 0 or Octant 1 and processed similarly as shown in the graph 800 of FIG. 8. Specifically, Octants 3, 4, and 7 can be viewed as a reflection of Octant 0 with respect to the x-axis, the y-axis, and the origin, respectively, and therefore can be computed using the same method for Octant 0 with data transpose and special attention to negative axis increment, i.e. the rays now grow out from 0 to −R, therefore, as the process progresses, the axis increment now steps from 0 to −R. Octants 2, 5, and 6 can be viewed as the reflections of Octant 1 with respect to the x-axis, the y-axis, and the origin, respectively, and processed accordingly.

DMA and Pipeline Management

Another key aspect in efficient parallel computing according to the invention is memory access and pipeline management. Because memory access requires certain time cycles to fetch or store data, the time for DMA to complete is the wait time. When the processor starts to process data but the data is not ready, the processor becomes idle and waits for the data before it can proceed. The objective of DMA and pipeline management is to wisely parallelize the memory access with the data processing to hide the DMA wait time and minimize or even eliminate the processor's idle time so that the parallel computation performance can be maximized. Below, we present a DMA double buffering method and computation flow pipeline design in order to achieve optimum performance.

DMA Double Buffering Method

Figure 9:
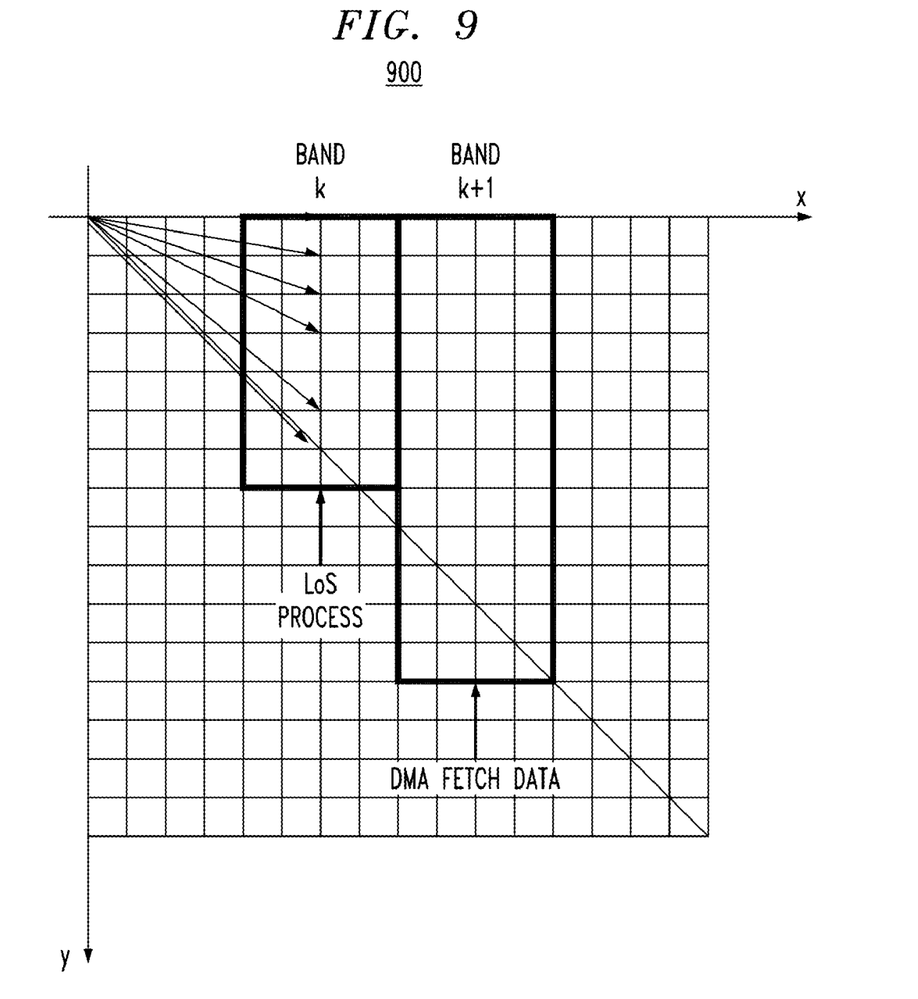
FIG. 9 shows parallel operations of LoS computing and Direct-Memory-Access data fetching with double buffer method, according to an embodiment of the invention.

To hide the DMA wait time as much as possible, illustrative embodiments of the invention provide a double buffering method 900 to parallelize the operations of DMA and LoS view-shed computing. FIG. 9 illustrates the parallel operations of LoS computing and DMA data fetching for the octants that perform data transpose. The octant is partitioned into bands of columns with certain width. The entire band of data is fetched from the system memory into the SPE local store efficiently using the DMA list command. While the SPE processor is computing the LoS visibilities with the DEM data in Band k that has been already read in and transposed in one data buffer, it is also fetching the DEM data of Band k+1 into another data buffer in SPE's local store. In the double buffering method, the data computing process and the data fetch or store processes are in parallel. We used DMA double buffering methods for the DEM data fetches as well as the view-shed result output stores and almost all DMA wait time have been hidden. Advantageously, the total SPE processors' idle time has been reduced to negligible cycle numbers.

For the octants that do not need data transposed, we also employed the DMA double buffering methods for fetching DEM input data and storing view-shed output to effectively minimize the processor wait time.

Data Processing and DMA Pipeline Management

Figure 10:
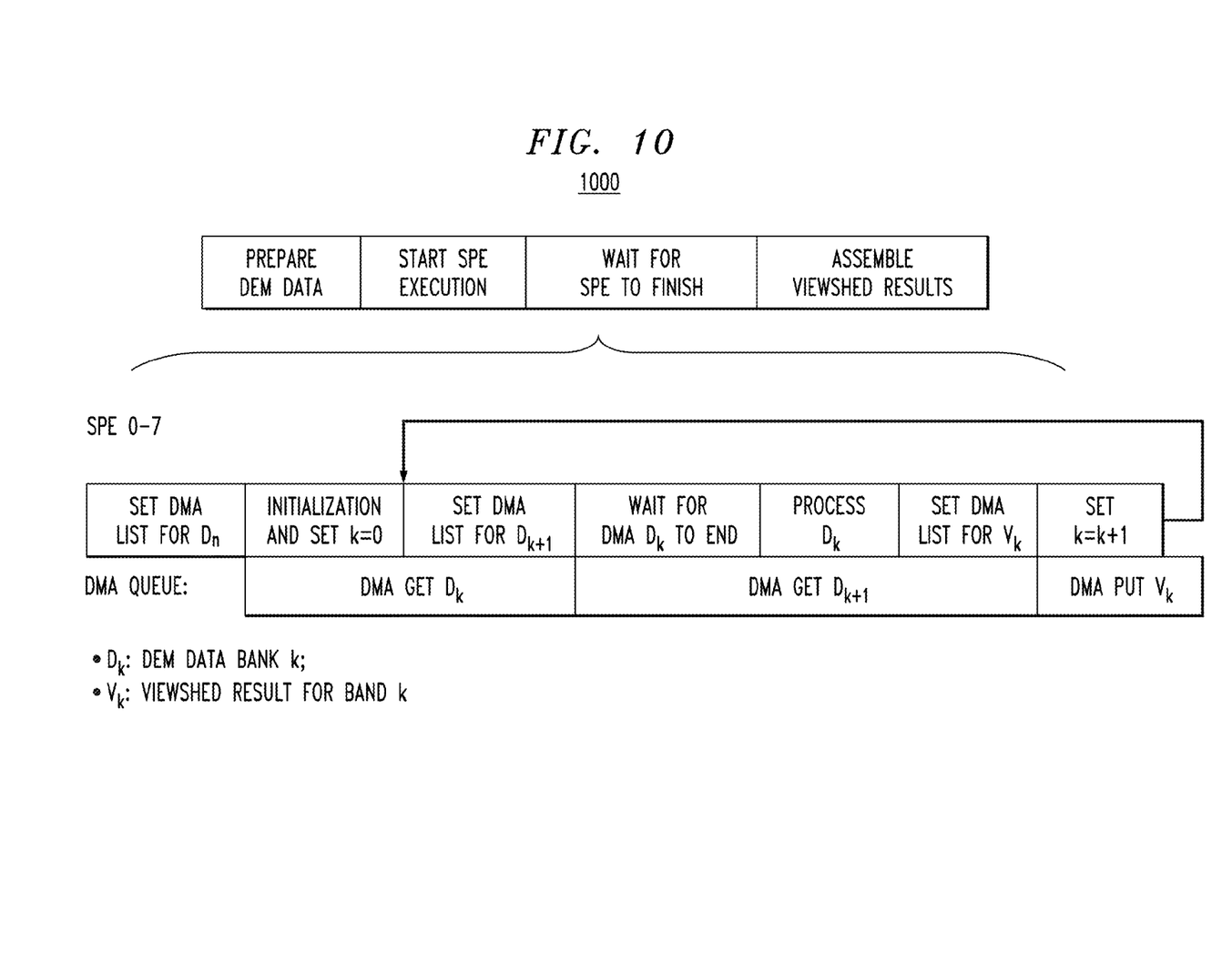
FIG. 10 shows pipeline orders for LoS parallel computing on a computing system, according to one embodiment of the invention.

To minimize the processor's idle time, the order of the data computation process and DMA process are also key. The order of these processes should be carefully planned and managed because the arrangement of the execution orders of these processes in the pipeline will directly impact the over performance. Illustration 1000 in FIG. 10 depicts the concurrent time line processes for LoS parallel computing on the CBE according to one embodiment of the invention. The computing process starts with PPE preparing DEM data (setting up the buffer starting address points for each of the sub-areas and the parameters of AOI, and launching SPEs). Each of the SPEs calculates the view-shed of the given sub-area by two concurrent operation processes. One operation process only handles the input and output DMAs to fetch the next band $D_{k+1}$ of the data associated with the sub-area and output the view-shed results of the current band $V_k$ once it is available. Meanwhile, the second operation process prepares DMA list parameters for fetching the next data band, calculates the view-shed of the current band, and sets up the DMA list parameters for sending out the view-shed results. The two operation processes repeat concurrently until all of the bands of the sub-area are processed. As it can be seen, the DMA operations are mostly in parallel with the data computing process, thus effectively reducing the processing latency.

It is to be appreciated that the Cell computer described above is only an illustrative example of one embodiment. That is, principles of the invention can be applied on any multi-processor computing systems, and a SPE can be interchanged with a processor or a computing element, etc.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 9, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-9, can also include, as described herein, providing a system, wherein the system includes distinct modules (e.g., modules comprising software, hardware or software and hardware). By way of example only, the modules may include but are not limited to one or more LoS computation modules. These and other modules may be configured, for example, to perform the steps described and illustrated in the context of FIGS. 1-9.

One or more embodiments can make use of software running on one or more general purpose computers or workstations. With reference back to FIG. 3, recall that the client-server system in which methodologies of the invention may be implemented, included a server 310 and a client device 320. It is to be understood that the server is preferably a multicore processor including multiple processing elements each with a local store (memory). Although not shown, the server may have its own display (or other data output device) and keyboard (or other data input device). The client device 320 may include a processor, memory, a display, and a keyboard as well. However, it is to be understood that alternate embodiments of the invention contemplate the methodologies of the invention being implemented on one or more servers without any client device.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for computing a line of sight (LoS) map, comprising:
obtaining data representing at least one image;
identifying an observation point in the at least one image;
partitioning a portion of the data that is associated with a given area in the image into a plurality of sub-areas; and
assigning the plurality of sub-areas to a plurality of processor elements of a parallel computing system, respectively, such that the data associated with each one of the plurality of sub-areas is processed independent from the data associated with each other of the plurality of sub-areas, wherein results of the processing by the processor elements represents the LoS map.

2. The method of claim 1, wherein the partitioning step further comprises partitioning the portion of the data that is associated with the given area in the image into the plurality of sub-areas such that any ray growing out of the observation point intersects only one of the plurality of sub-areas.

3. The method of claim 1, wherein the given area is an area of interest.

4. The method of claim 1, wherein one or more single-instruction-multiple-data operations can be performed on each one of the plurality of processor elements and in each one of the plurality of processor elements.

5. The method of claim 4, wherein one of the one or more single-instruction-multiple-data operations is applied to the same corresponding data points on a plurality of rays that are respectively identified in the sub-areas.

6. The method of claim 4, wherein data in at least a portion of the plurality of sub-areas is transposed such that the data corresponding to each sub-area is aligned to efficiently perform single-instruction-multiple-data operations.

7. The method of claim 6, wherein, for the sub-areas having data that is transposed, partitioning the data of the sub-area into two or more bands of data such that while the processor element of the sub-area is processing data associated with a first one of the bands, data associated with a second one of the bands is fetched.

8. The method of claim 6, further wherein view-shed results of one band are stored in one output buffer while view-shed results of a previous band stored in a second output buffer are output.

9. The method of claim 6, wherein data in a sub-area is transposed with a recursive byte shuffle algorithm comprising multiple swaps with data elements among a set of registers or vector variables.

10. The method of claim 1, wherein the parallel computing system comprises a multicore processor.

11. A parallel computing system for computing a line of sight (LoS) map, the parallel computing system comprising a plurality of processor elements, wherein the parallel computing system is configured to:
obtain data representing at least one image, wherein an observation point is identified in the at least one image; and
in response to: (i) a portion of the data that is associated with a given area in the image being partitioned into a plurality of sub-areas; and (ii) the plurality of sub-areas being assigned to the plurality of processor elements, respectively; process the data associated with each one of the plurality of sub-areas independent from the data associated with each other of the plurality of sub-areas, wherein results of the processing by the processor elements represents the LoS map.

12. The system of claim 11, wherein the partitioning operation further comprises partitioning the portion of the data that is associated with the given area in the image into the plurality of sub-areas such that any ray growing out of the observation point intersects only one of the plurality of sub-areas.

13. The system of claim 11, wherein the given area is an area of interest.

14. The system of claim 11, wherein one or more single-instruction-multiple-data operations can be performed on each one of the plurality of processor elements and in each one of the plurality of processor elements.

15. The system of claim 14, wherein one of the one or more single-instruction-multiple-data operations is applied to the same corresponding data points on a plurality of rays that are respectively identified in the sub-areas.

16. The system of claim 14, wherein data in at least a portion of the plurality of sub-areas is transposed such that the data corresponding to each sub-area is aligned to efficiently perform single-instruction-multiple-data operations.

17. The system of claim 16, wherein, for the sub-areas having data that is transposed, the data of the sub-area is partitioned into two or more bands of data such that while the processor element of the sub-area is processing data associated with a first one of the bands, data associated with a second one of the bands is fetched.

18. The system of claim 16, further wherein view-shed results of one band are stored in one output buffer while view-shed results of a previous band stored in a second output buffer are output.

19. The system of claim 16, wherein data in a sub-area is transposed with a recursive byte shuffle algorithm comprising multiple swaps with data elements among a set of registers or vector variables.

20. An article of manufacture for computing a line of sight (LoS) map for use in a parallel computing system comprising a plurality of processor elements, the article of manufacture comprising a computer readable storage medium tangibly embodying a computer readable program code which, when executed by the parallel computing system, causes the parallel computing system to:

obtain data representing at least one image, wherein an observation point is identified in the at least one image; and in response to: (i) a portion of the data that is associated with a given area in the image being partitioned into a plurality of sub-areas; and (ii) the plurality of sub-areas being assigned to the plurality of processor elements, respectively; process the data associated with each one of the plurality of sub-areas independent from the data associated with each other of the plurality of sub-areas, wherein results of the processing by the processor elements represents the LoS map.

* * * * *